Patented Oct. 5, 1937

2,094,837

UNITED STATES PATENT OFFICE 2,094,837

PROCESS OF PREPARING ALKYLENE SULPHIDES

Karl Dachlauer, Hofheim-on-the-Taunus, and Lothar Jackel, Frankfort - on - the - Main-Hochst, Germany, assignors to I. G. Farbenindustrie Aktiengesellschaft, Frankfort-on-the-Main, Germany No Drawing. Application November 7, 1935, Serial No. 48,788. In Germany November 10, 1934

5 Claims. (Cl. 260—53)

The present invention relates to a process of preparing alkylene sulphides.

We have found that ethyleneoxide and derivatives thereof, namely aliphatic compounds containing the group

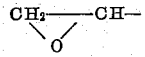

such as propylene oxide, glycide and epichlorhydrine may be caused to react with thiocyanides whereby sulphur is exchanged for oxygen and, on the one hand, the corresponding alkylene sulphides and, on the other hand, the cyanates are formed. It is advantageous to carry out these reactions in the presence of solvents, for instance, water, alcohol, ether or mixtures thereof, or accelerators such as alkali chlorides, alkali carbonates. The compounds obtained are valuable intermediate products, especially for the production of assistants for the textile industry.

The following examples serve to illustrate the invention but they are not intended to limit it thereto, the parts being by weight:

(1) 30 parts of ethyleneoxide are introduced into a solution of 45 parts of potassium thiocyanide in 45 parts of water, a temperature of −5° C. to −10° C. being maintained. After standing for several hours at this temperature, ethylene sulphide has separated on the aqueous solution whereas, at the same time, part of the potassium cyanate formed has crystallized from the solution.

The reaction takes place according to the following equation:

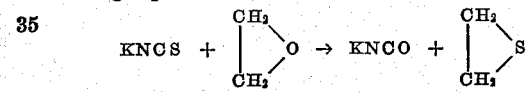

The ethylenesulphide boils at 55° C.–56° C. under a pressure of 760 mm.

The yield amounts to 26.9 parts i. e. 97% calculated upon KNCS.

(2) 46 parts of epichlorhydrine are introduced, while stirring, into a solution of 50 parts of KNCS in 50 parts of water, the temperature being maintained at 25° C. The whole is then stirred for several hours, shaken with benzene, the benzene extract is dried with molten $Na_2SO_4$ and the benzene is distilled off. The residue is distilled in vacuo. There is obtained with a good yield chloropropylene sulphide which boils at 94° C.–96° C. under a pressure of about 6 mm.

We claim:

1. The process of producing alkylene sulphides which comprises causing an alkylene oxide to react with a salt of thiocyanic acid.

2. The process of producing alkylene sulphides which comprises causing an alkylene oxide to react with an alkali metal salt of thiocyanic acid.

3. The process of producing ethylene sulphide which comprises causing ethylene oxide to react with potassium thiocyanide.

4. The process of producing alkylene sulphides which comprises causing an alkylene oxide to react with a salt of thiocyanic acid in the presence of a solvent.

5. The process of producing alkylene sulphides which comprises causing an alkylene oxide to react with a salt of thiocyanic acid in the presence of water.

KARL DACHLAUER.
LOTHAR JACKEL.